United States Patent
Chatterjee et al.

(10) Patent No.: US 11,182,077 B1
(45) Date of Patent: Nov. 23, 2021

(54) SYSTEMS, DEVICES AND METHODS USING A SOLID STATE DEVICE AS A CACHING MEDIUM WITH AN SSD FILTERING OR SSD PRE-FETCH ALGORITHM

(71) Applicant: AmZetta Technologies, LLC, Norcross, GA (US)

(72) Inventors: Paresh Chatterjee, Fremont, CA (US); Srikumar Subramanian, Suwanee, GA (US); Narayanaswami Ganapathy, Newark, CA (US); Senthilkumar Ramasamy, Duluth, GA (US)

(73) Assignee: AmZetta Technologies, LLC, Norcross, GA (US)

( * ) Notice: Subject to any disclaimer, the term of this patent is extended or adjusted under 35 U.S.C. 154(b) by 0 days.

(21) Appl. No.: 16/150,381

(22) Filed: Oct. 3, 2018

Related U.S. Application Data

(62) Division of application No. 15/145,099, filed on May 3, 2016, now Pat. No. 10,108,344.

(60) Provisional application No. 62/157,506, filed on May 6, 2015.

(51) Int. Cl.
  *G06F 12/00* (2006.01)
  *G06F 13/00* (2006.01)
  *G06F 3/06* (2006.01)
  *G06F 12/0862* (2016.01)

(52) U.S. Cl.
  CPC ............ *G06F 3/061* (2013.01); *G06F 3/0655* (2013.01); *G06F 3/0685* (2013.01); *G06F 3/0689* (2013.01); *G06F 12/0862* (2013.01); *G06F 2212/602* (2013.01)

(58) Field of Classification Search
  CPC ...... G06F 3/0655; G06F 3/061; G06F 3/0685; G06F 3/0689; G06F 12/0862; G06F 2212/602
  USPC ......................................................... 711/114
  See application file for complete search history.

(56) References Cited

U.S. PATENT DOCUMENTS

| | | | |
|---|---|---|---|
| 4,989,131 A | 1/1991 | Stone | |
| 5,499,337 A | 3/1996 | Gordon | |
| 5,638,498 A * | 6/1997 | Tyler | G06K 15/00 358/1.16 |
| 5,675,769 A * | 10/1997 | Ruff | G06F 3/0607 711/112 |
| 5,680,579 A | 10/1997 | Young et al. | |
| 5,732,240 A | 3/1998 | Caccavale | |

(Continued)

*Primary Examiner* — Sheng Jen Tsai
(74) *Attorney, Agent, or Firm* — Meunier Carlin & Curfman LLC

(57) ABSTRACT

A method for determining when to load read I/O operations into an SSD cache medium for a physical storage medium of a data storage system can include maintaining an SSD filter bitmap with a plurality of bits, where each of the bits corresponds to a respective data block of the physical storage medium. The method can also include initially setting each of the bits to a first predetermined value, receiving a first read I/O operation directed to a particular data block of the physical storage medium and, in response to receiving the first read I/O operation, setting a bit corresponding to the particular data block to a second predetermined value. The method can further include receiving a second read I/O operation directed to the particular data block and, in response to receiving the second I/O operation, loading data for the particular data block into the SSD cache medium.

10 Claims, 9 Drawing Sheets

(56) References Cited

U.S. PATENT DOCUMENTS

| | | | |
|---|---|---|---|
| 5,757,771 A | 5/1998 | Li et al. | |
| 5,799,324 A * | 8/1998 | McNutt | G06F 3/061 |
| 5,802,561 A | 9/1998 | Fava et al. | |
| 5,892,937 A | 4/1999 | Caccavale | |
| 5,991,515 A * | 11/1999 | Fall | G06T 9/00 |
| | | | 358/1.12 |
| 6,175,900 B1 * | 1/2001 | Forin | G06F 12/023 |
| | | | 707/999.202 |
| 6,490,578 B1 * | 12/2002 | Burkhard | G06F 16/2237 |
| 6,523,102 B1 | 2/2003 | Dye et al. | |
| 6,553,511 B1 | 4/2003 | DeKoning et al. | |
| 6,606,629 B1 | 8/2003 | DeKoning et al. | |
| 6,631,446 B1 * | 10/2003 | Cherkauer | G06F 3/0613 |
| | | | 711/133 |
| 6,651,153 B1 | 11/2003 | Orfali et al. | |
| 6,874,062 B1 * | 3/2005 | Goldberg | G06F 3/0613 |
| | | | 707/999.003 |
| 6,965,442 B1 * | 11/2005 | Taki | H04N 1/00281 |
| | | | 358/1.15 |
| 7,177,850 B2 * | 2/2007 | Argenton | G06Q 30/0283 |
| | | | 705/400 |
| 7,257,684 B1 * | 8/2007 | Sinha | G06F 3/0616 |
| | | | 711/154 |
| 7,953,002 B2 | 5/2011 | Opsasnick | |
| 8,087,017 B1 * | 12/2011 | Whaley | G06F 21/64 |
| | | | 718/1 |
| 8,219,724 B1 * | 7/2012 | Caruso | G06F 3/0604 |
| | | | 710/36 |
| 8,572,736 B2 * | 10/2013 | Lin | G06F 11/0706 |
| | | | 726/23 |
| 8,631,472 B1 * | 1/2014 | Martin | G06Q 20/40 |
| | | | 726/4 |
| 8,775,741 B1 * | 7/2014 | de la Iglesia | G06F 12/0862 |
| | | | 711/137 |
| 9,256,272 B2 * | 2/2016 | Hasegawa | G06F 16/10 |
| 9,256,542 B1 * | 2/2016 | Flower | G06F 3/0685 |
| 9,317,435 B1 * | 4/2016 | Bairavasundaram | |
| | | | G06F 12/0848 |
| 9,501,420 B2 * | 11/2016 | Susarla | G06F 12/0842 |
| 9,606,937 B1 * | 3/2017 | Marathe | G06F 12/122 |
| 9,632,932 B1 | 4/2017 | Sutardja et al. | |
| 9,798,754 B1 * | 10/2017 | Shilane | G06F 11/3037 |
| 10,019,362 B1 * | 7/2018 | Chatterjee | G06F 3/065 |
| 10,055,354 B1 | 8/2018 | Chatterjee et al. | |
| 10,089,227 B1 * | 10/2018 | Subramanian | G06F 12/0868 |
| 10,108,344 B1 * | 10/2018 | Chatterjee | G06F 12/0862 |
| 10,114,566 B1 | 10/2018 | Chatterjee et al. | |
| 10,176,103 B1 | 1/2019 | Chatterjee et al. | |
| 2002/0091965 A1 | 7/2002 | Moshayedi | |
| 2003/0220951 A1 * | 11/2003 | Muthulingam | G06F 3/0674 |
| 2004/0148471 A1 * | 7/2004 | Wallin | G06F 12/0862 |
| | | | 711/137 |
| 2004/0260883 A1 * | 12/2004 | Wallin | G06F 12/0862 |
| | | | 711/137 |
| 2005/0210193 A1 * | 9/2005 | Nagata | G06F 11/1451 |
| | | | 711/114 |
| 2005/0278486 A1 | 12/2005 | Trika et al. | |
| 2007/0006013 A1 | 1/2007 | Moshayedi et al. | |
| 2007/0133873 A1 * | 6/2007 | Aoyagi | G06K 9/00463 |
| | | | 382/176 |
| 2007/0260811 A1 | 11/2007 | Merry et al. | |
| 2007/0266037 A1 * | 11/2007 | Terry | G06F 3/0607 |
| 2008/0209153 A1 * | 8/2008 | Schneider | G06F 12/023 |
| | | | 711/170 |
| 2008/0209154 A1 * | 8/2008 | Schneider | G06F 12/023 |
| | | | 711/170 |
| 2009/0138754 A1 * | 5/2009 | Edwards | G06F 11/1068 |
| | | | 714/6.11 |
| 2009/0204853 A1 | 8/2009 | Diggs et al. | |
| 2009/0210620 A1 * | 8/2009 | Jibbe | G06F 11/108 |
| | | | 711/114 |
| 2009/0228646 A1 | 9/2009 | Edwards et al. | |
| 2010/0070703 A1 | 3/2010 | Sarkar | |
| 2010/0082879 A1 | 4/2010 | McKean et al. | |
| 2010/0088459 A1 * | 4/2010 | Arya | G06F 3/0656 |
| | | | 711/103 |
| 2010/0100664 A1 | 4/2010 | Shimozono | |
| 2010/0122200 A1 | 5/2010 | Merry et al. | |
| 2010/0162083 A1 * | 6/2010 | Chung | G06F 11/1068 |
| | | | 714/764 |
| 2010/0199348 A1 * | 8/2010 | Sahni | H04L 63/1416 |
| | | | 726/23 |
| 2010/0235670 A1 | 9/2010 | Keller et al. | |
| 2010/0250842 A1 * | 9/2010 | Deshpande | G06F 12/0862 |
| | | | 711/108 |
| 2010/0299547 A1 * | 11/2010 | Saika | G06F 3/0625 |
| | | | 713/324 |
| 2011/0029686 A1 * | 2/2011 | Sethi | H04L 41/18 |
| | | | 709/235 |
| 2011/0087833 A1 | 4/2011 | Jones | |
| 2011/0099326 A1 * | 4/2011 | Jung | G06F 3/0613 |
| | | | 711/103 |
| 2011/0153606 A1 * | 6/2011 | Kim | G06F 16/1827 |
| | | | 707/737 |
| 2011/0173378 A1 | 7/2011 | Filor et al. | |
| 2011/0238922 A1 * | 9/2011 | Hooker | G06F 12/0862 |
| | | | 711/137 |
| 2011/0302365 A1 * | 12/2011 | Heo | G06F 12/0866 |
| | | | 711/104 |
| 2012/0005451 A1 * | 1/2012 | Lee | G06F 12/0246 |
| | | | 711/203 |
| 2012/0023304 A1 * | 1/2012 | Chan | H04L 47/30 |
| | | | 711/170 |
| 2012/0072698 A1 * | 3/2012 | Esaki | G06F 12/0246 |
| | | | 711/207 |
| 2012/0159071 A1 * | 6/2012 | Kamon | G06F 11/1435 |
| | | | 711/118 |
| 2012/0185647 A1 * | 7/2012 | Dawkins | G06F 3/0685 |
| | | | 711/114 |
| 2012/0221774 A1 | 8/2012 | Atkisson et al. | |
| 2013/0024616 A1 * | 1/2013 | Kawaguchi | G06F 3/0605 |
| | | | 711/114 |
| 2013/0038961 A1 * | 2/2013 | Song | G11B 20/1883 |
| | | | 360/49 |
| 2013/0080725 A1 * | 3/2013 | Usui | G06F 3/065 |
| | | | 711/162 |
| 2013/0122856 A1 | 5/2013 | Kalmbach et al. | |
| 2013/0132650 A1 * | 5/2013 | Choi | G06F 3/0679 |
| | | | 711/103 |
| 2013/0145223 A1 * | 6/2013 | Okada | G06F 3/0619 |
| | | | 714/54 |
| 2013/0173955 A1 * | 7/2013 | Hallak | G06F 12/0866 |
| | | | 714/6.24 |
| 2013/0185511 A1 | 7/2013 | Sassone et al. | |
| 2013/0191591 A1 * | 7/2013 | Kim | G06F 3/068 |
| | | | 711/114 |
| 2013/0229959 A1 * | 9/2013 | Ghosh | H04W 74/08 |
| | | | 370/311 |
| 2013/0285835 A1 * | 10/2013 | Kim | H04Q 9/00 |
| | | | 340/870.02 |
| 2013/0318603 A1 * | 11/2013 | Merza | H04L 67/02 |
| | | | 726/22 |
| 2014/0047281 A1 * | 2/2014 | Masuo | G11C 16/3495 |
| | | | 714/47.1 |
| 2014/0050002 A1 * | 2/2014 | Sun | G11C 15/00 |
| | | | 365/49.1 |
| 2014/0052942 A1 * | 2/2014 | Satou | G06F 3/0611 |
| | | | 711/154 |
| 2014/0075095 A1 * | 3/2014 | Manohar | G06F 3/0608 |
| | | | 711/103 |
| 2014/0089558 A1 | 3/2014 | Baderdinni | |
| 2014/0095458 A1 * | 4/2014 | Kim | G06F 16/2255 |
| | | | 707/698 |
| 2014/0095547 A1 * | 4/2014 | Guo | G06F 16/185 |
| | | | 707/792 |
| 2014/0095556 A1 * | 4/2014 | Lee | G06F 16/13 |
| | | | 707/824 |
| 2014/0095772 A1 * | 4/2014 | Lee | G06F 3/061 |
| | | | 711/103 |

(56) References Cited

U.S. PATENT DOCUMENTS

| | | | |
|---|---|---|---|
| 2014/0101115 A1* | 4/2014 | Ko | G06F 16/1727 |
| | | | 707/692 |
| 2014/0129758 A1 | 5/2014 | Okada et al. | |
| 2014/0143505 A1 | 5/2014 | Sim et al. | |
| 2014/0156964 A1* | 6/2014 | Choi | G06F 12/0646 |
| | | | 711/171 |
| 2014/0195725 A1* | 7/2014 | Bennett | G06F 12/06 |
| | | | 711/103 |
| 2014/0201442 A1 | 7/2014 | Rajasekaran et al. | |
| 2014/0325166 A1* | 10/2014 | Iyigun | G06F 12/14 |
| | | | 711/158 |
| 2015/0026403 A1* | 1/2015 | Ish | G06F 12/0868 |
| | | | 711/118 |
| 2015/0046653 A1* | 2/2015 | Soundararajan | G06F 12/0871 |
| | | | 711/122 |
| 2015/0052393 A1* | 2/2015 | Palmer | G06F 11/108 |
| | | | 714/15 |
| 2015/0095567 A1 | 4/2015 | Noda | |
| 2015/0186401 A1* | 7/2015 | Baldwin | G06F 16/1724 |
| | | | 707/693 |
| 2015/0206558 A1* | 7/2015 | Ni | G11C 7/1072 |
| | | | 711/106 |
| 2015/0278127 A1* | 10/2015 | Takakura | G06F 3/0659 |
| | | | 711/168 |
| 2015/0370715 A1 | 12/2015 | Samanta et al. | |
| 2016/0004459 A1* | 1/2016 | Oohira | G06F 3/0688 |
| | | | 711/103 |
| 2016/0011782 A1 | 1/2016 | Kurotsuchi et al. | |
| 2016/0170639 A1 | 6/2016 | Velayudhan et al. | |
| 2016/0276015 A1* | 9/2016 | Bains | G11C 29/50 |
| 2017/0359371 A1* | 12/2017 | Merza | A61G 17/042 |

\* cited by examiner

SYSTEMS, DEVICES AND METHODS USING A SOLID STATE DEVICE AS A CACHING MEDIUM WITH AN SSD FILTERING OR SSD PRE-FETCH ALGORITHM

CROSS-REFERENCE TO RELATED APPLICATIONS

This application is a divisional of U.S. patent application Ser. No. 15/145,099, filed on May 3, 2016, entitled "SYSTEMS, DEVICES AND METHODS USING A SOLID STATE DEVICE AS A CACHING MEDIUM WITH AN SSD FILTERING OR SSD PRE-FETCH ALGORITHM," claims the benefit of U.S. Provisional Patent Application No. 62/157,506, filed on May 6, 2015, entitled "SYSTEMS, DEVICES AND METHODS USING A SOLID STATE DEVICE AS A CACHING MEDIUM WITH AN SSD FILTERING OR SSD PRE-FETCH ALGORITHM," the disclosures of which are expressly incorporated herein by reference in their entireties.

BACKGROUND

Generally caching of block device data at a relatively lower latency device provides phenomenal performance for both read and write input/output ("I/O") operations. As a read cache, data is stored in the cache device until it is replaced with the new data. Until then, the data is read from the cache device for subsequent read I/O operations directed to the same data block. As a write cache, new data is written to the cache device, and the write I/O operation is informed completed. Later based on policy, the dirty data stored in the cache device is persisted to the underlying stable medium. In addition, the cache device can be a solid state device ("SSD"). When compared to a hard disk drive, SSD devices have superior read and write performance. It is therefore desirable to maximize use of the SSD device(s) as the cache device to achieve a greater performance advantage.

In conventional data storage systems, petabytes of data may be stored, and this data may be stored in a number of different types of storage devices/drives. Additionally, similar types of storage devices/drives can be grouped into a tier. For example, relatively lower performance storage devices/drives grouped in lower tiers (e.g., serial advanced technology attachment ("SATA") drives) may be used to store archival data, which is less frequently accessed. The lower performance storage devices/drives are less costly and, because the archival data is accessed less frequently, the lower I/O performance may be acceptable. Relatively higher performance storage devices/drives grouped in higher tiers (e.g., high RPM serially attached SCSI ("SAS") drives) may be used to store "hot" data, i.e., frequently accessed data. The amount of hot data typically makes up a smaller portion of the total data, for example, terabytes of the petrabytes stored in the data storage system. Although the higher performance storage devices/drives are more costly, their higher I/O performance capabilities are needed to provide the desired level of service. Thus, to maximize use of the available SSD devices that can cache data for the data storage system, it can be desirable to use the SSD devices to cache hot data stored in the higher tiers (e.g., terabytes of data), while avoiding caching all of the data (e.g., petrabytes of data) including less-frequently accessed data.

SUMMARY

An example computer-implemented method for determining when to load read I/O operations into an SSD cache medium for a physical storage medium of a data storage system can include maintaining an SSD filter bitmap with a plurality of bits, where each of the bits of the SSD filter bitmap corresponds to a respective data block of the physical storage medium. The method can also include initially setting each of the bits of the SSD filter bitmap to a first predetermined value, receiving a first read I/O operation directed to a particular data block of the physical storage medium, and in response to receiving the first read I/O operation, setting a bit of the SSD filter bitmap corresponding to the particular data block of the physical storage medium to a second predetermined value. The method can further include receiving a second read I/O operation directed to the particular data block of the physical storage medium, and in response to receiving the second I/O operation, loading data for the particular data block into the SSD cache medium.

Additionally, the method can include determining, using the SSD filter bitmap, that the first read I/O operation is an initial read I/O operation directed to the particular data block of the physical storage medium, and servicing the first read I/O operation from the physical storage medium. Further, the data for the particular data block is not loaded into the SSD cache medium in response to the first read I/O operation.

Alternatively or additionally, the method can include determining, using the SSD filter bitmap, that the second read I/O operation is a subsequent read I/O operation directed to the particular data block of the physical storage medium, determining whether the data for the particular data block is stored in the SSD cache medium, and if the data for the particular data block is stored in the SSD cache medium, servicing the second read I/O operation from the SSD cache medium. In addition, if the data for the particular data block is not stored in the SSD cache medium, the method can include servicing the second read I/O operation from the physical storage medium and loading the data for the particular data block into the SSD cache medium in response to the second read I/O operation.

Optionally, the method can further include periodically re-setting at least one of the bits of the SSD filter bitmap to the first predetermined value. The re-set bit of the SSD filter bitmap can optionally correspond to a respective data block of the physical storage medium having a frequency of access less than a threshold value.

Alternatively or additionally, the method can optionally further include dividing the SSD filter bitmap and the physical storage medium into a plurality of zones, where each of the zones of the SSD filter bitmap corresponds to a respective zone of the physical storage medium, and allocating memory for the zones of the SSD filter bitmap on demand in response to receiving an initial read I/O operation directed to the respective zones of the physical storage medium.

An example computer-implemented method for pre-fetching data blocks stored in a physical storage medium of a data storage system and loading the data blocks into an SSD cache medium for the physical storage medium can include maintaining an SSD pre-fetch block for a data block of the physical storage medium, where the SSD pre-fetch block includes a pre-fetch bitmap with a plurality of bits corresponding to respective time slots. The method can also include setting at least one of the bits of the pre-fetch bitmap to a predetermined value based on historic access data for the data block of the physical storage medium, where the bits of the pre-fetch bitmap set to the predetermined value mark a peak time slot. The method can further include determining, using the SSD pre-fetch block, the peak time slot, and loading the data block of the physical storage medium into the SSD cache medium at a beginning of the peak time slot.

Additionally, the SSD pre-fetch block can include a day access bitmap with a plurality of bits corresponding to the respective time slots. In addition, the SSD pre-fetch block can include a time access counter for tracking a number of times the data block of the physical storage medium is accessed during each of the respective time slots. The method can optionally further include setting at least one of the bits of the day access bitmap to the predetermined value in response to the time access counter being greater than a threshold value.

Additionally, the historic access data can include a plurality of day access bitmaps for the data block of the physical storage medium at previous times. In addition, the step of setting at least one of the bits of the pre-fetch bitmap to a predetermined value can include performing an OR function on respective bits of the day access bitmaps for the data block of the physical storage medium at previous times. Alternatively, the step of setting at least one of the bits of the pre-fetch bitmap to a predetermined value can include performing an AND function on respective bits of the day access bitmaps for the data block of the physical storage medium at previous times.

Optionally, each of the bits of the pre-fetch bitmap corresponds to an equal-length time slot. Alternatively, the bits of the pre-fetch bitmap optionally correspond to a plurality of unequal-length time slots.

It should be understood that the above-described subject matter may also be implemented as a computer-controlled apparatus, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for filtering read I/O operations before loading the read I/O operations into an SSD cache medium and for pre-fetching and loading particular data blocks of a physical storage medium into the SSD cache medium, it will become evident to those skilled in the art that the implementations are not limited thereto.

Figure 1:
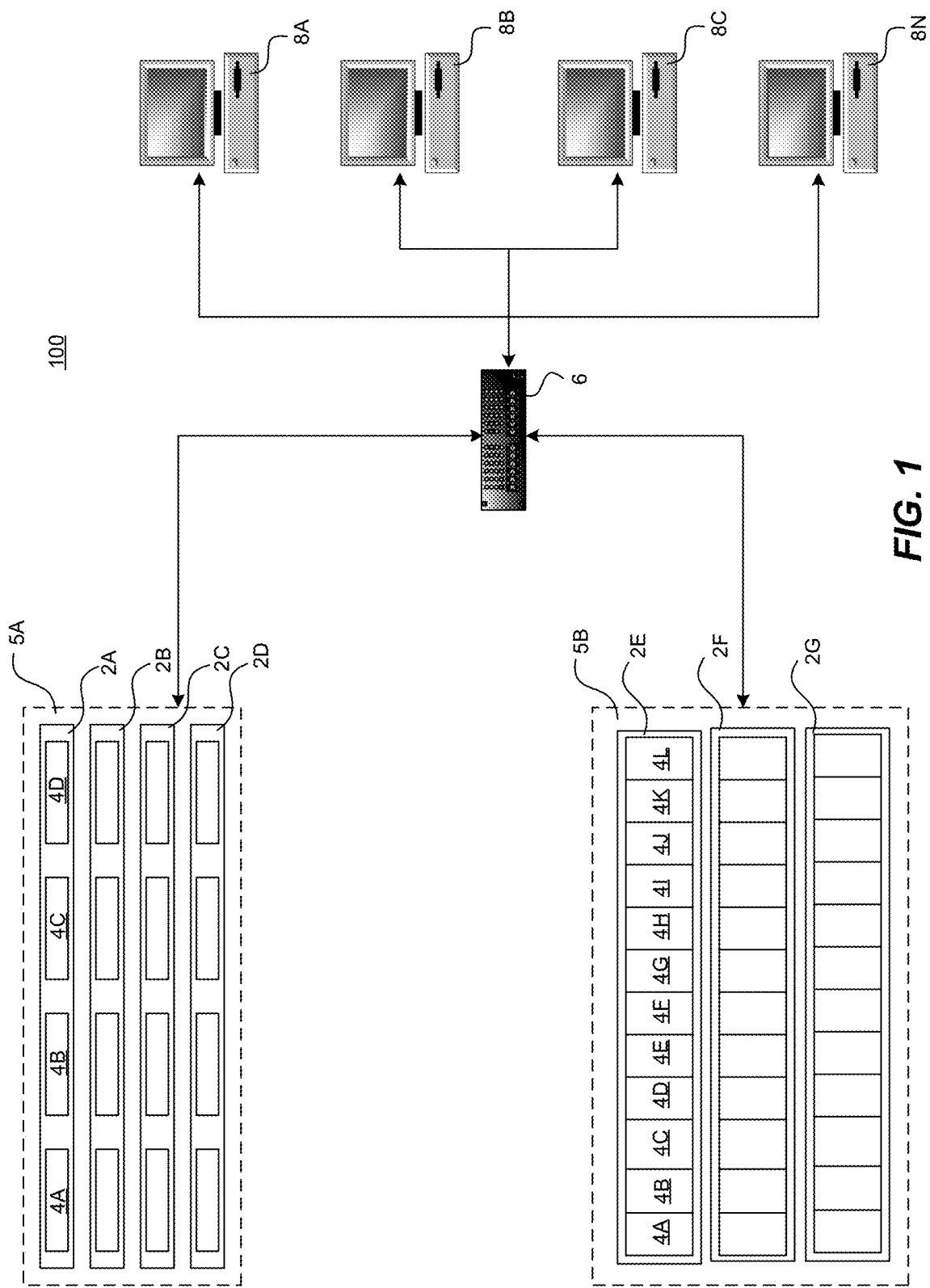
FIG. 1 is a computer architecture and network diagram showing aspects of a computer network and a storage server computer that provides an operating environment for embodiments of the disclosure presented herein.
Figure 2:
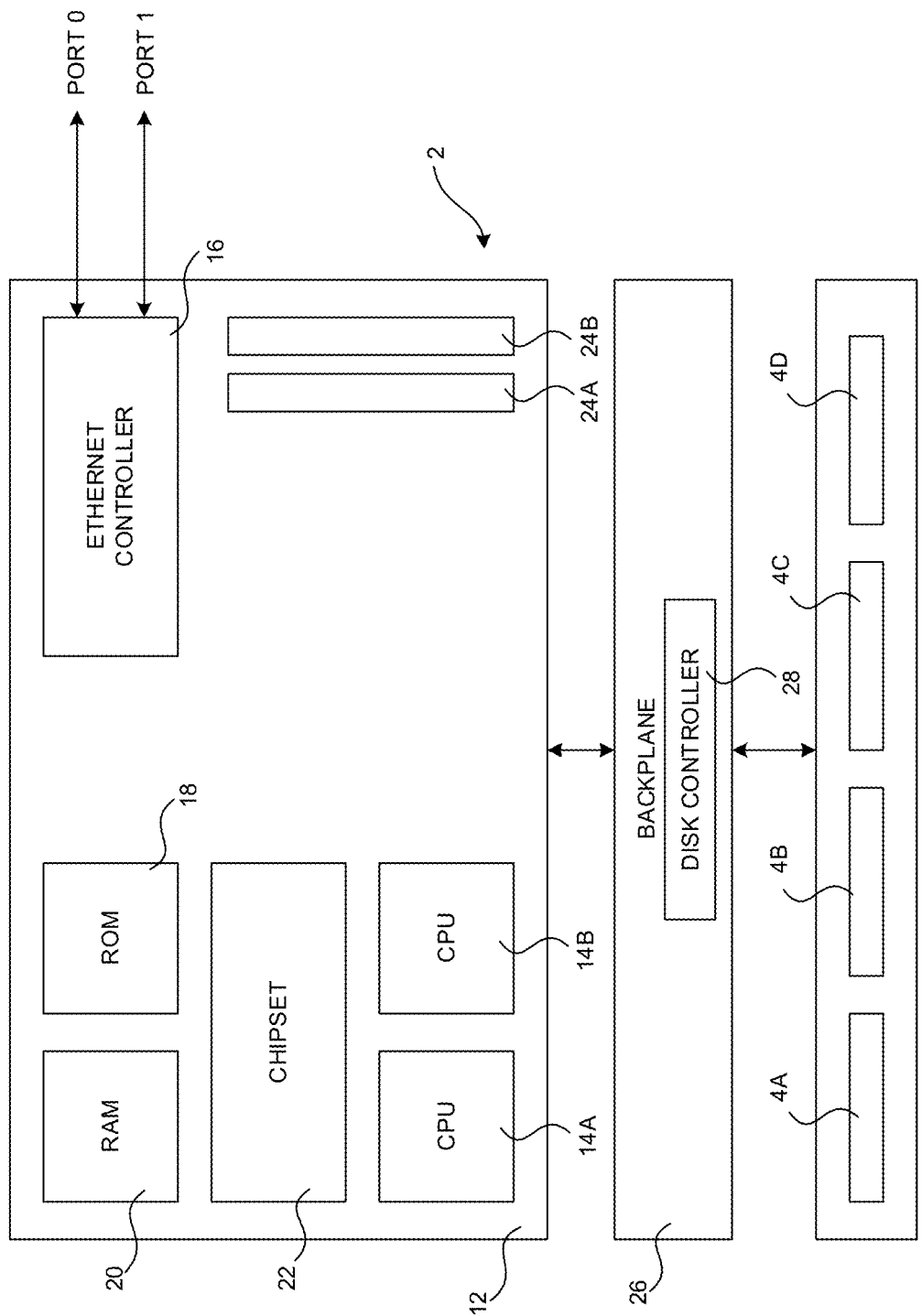
FIG. 2 is a computer architecture diagram illustrating aspects of the hardware of an illustrative storage server computer described herein.
Figure 3:
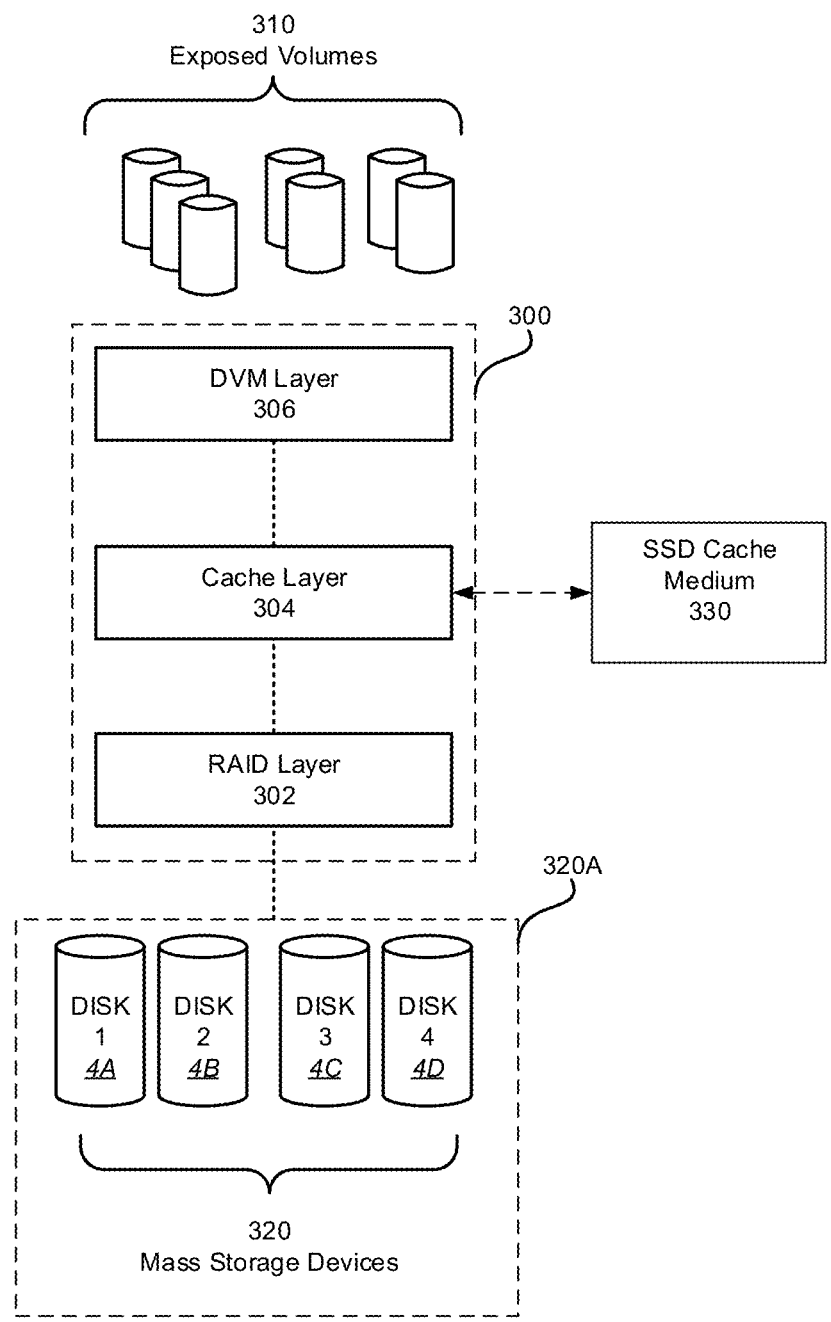
FIG. 3 is a software architecture diagram illustrating various aspects of a storage stack utilized by a storage server computer described herein.

FIGS. 1-3 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. While the implementations presented herein will be described in the general context of program modules that execute in conjunction with an operating system on a computer system, those skilled in the art will recognize that they may also be implemented in combination with other program modules.

Turning now to FIG. 1, details will be provided regarding an illustrative operating environment for the implementations presented herein, as well as aspects of software components that provide the functionality described herein for using a plurality of SSDs as a caching medium for a data storage system. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes hard disk drives 4A-4L. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C and 2D. The cluster 5B may similarly stripe data across the storage nodes 2E, 2F and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") or Fiber Channel protocol may be utilized to enable the initiators 8A-8N to communicate with and utilize the various functions of the storage clusters 5A-5B over a wide area network such as the Internet. An appropriate protocol, such as iSCSI, Fiber Channel, or Serial Attached SCSI ("SAS"), is also used to enable the members of the storage cluster to communicate with each other. These two protocols need not be similar.

Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Referring now to FIG. 2, an illustrative computer hardware architecture for practicing various embodiments will now be described. In particular, FIG. 2 shows an illustrative computer architecture and implementation for each storage node 2. In particular, each storage server computer 2 includes a baseboard 12, or "motherboard," which is a printed circuit board to which a multitude of components or devices may be connected by way of a system bus or other electrical communication path. In one illustrative embodiment, these components include, without limitation, one or more central processing units ("CPUs") 14A-14B, a network adapter, such as the Ethernet controller 16, a system memory, including a Read Only Memory 18 ("ROM") and a Random Access Memory 20 ("RAM"), and other hardware for performing input and output, such as a video display adapter or a universal serial bus port ("USB"), not all of which are illustrated in FIG. 2.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciate that, although not illustrated in FIG. 2, a RAID controller may also be embedded on the motherboard 12 or implemented in software by the storage server computer 2. It is also contemplated that the storage server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include LAN or WAN connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The disk controller 28 may interface with the hard disk drives 4A-4D through a serial advanced technology attachment ("SATA") interface, a small computer system interface ("SCSI"), a fiber channel ("FC") interface, a SAS interface, or other standard interface for physically connecting and transferring data between computers and physical storage devices. The mass storage devices may store an operating system suitable for controlling the operation of the storage server computer 2, such as the LINUX operating system. The mass storage devices may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Referring now to FIG. 3, an example computer software architecture for practicing the various embodiments presented herein will now be described. The computer software architecture can be implemented in a storage node 2 shown in FIGS. 1 and 2, for example. In particular, FIG. 3 illustrates a storage stack 300 used in the embodiments described herein. The storage stack 300 can include a RAID layer 302, a cache layer 304 and a distributed volume management ("DVM") layer 306. At the top of the storage stack 300, storage volumes 310 are exposed, for example, to the initiators 8A-8N shown in FIG. 1. At the bottom of the storage stack 300 are the mass storage devices 320, such as the disks 4A-4D, that are used to store the data. As discussed above, the mass storage devices are connected to a disk controller such as the disk controller 28 shown in FIG. 2. The disk controller interfaces with the mass storage devices using any standard interface such as SATA, SCSI, FC, SAS interface, etc. for physically connecting and transferring data between computers and the mass storage devices.

The RAID layer 302 abstracts the organization of the RAID array 320A and presents a logical block-level interface to higher layers in the storage stack 300. For example, the RAID layer 302 can implement RAID level 5, where data is striped across the plurality of disks (e.g., disks 4A-4D) in the RAID array 320A. In a four disk array, a RAID stripe includes data block $D_1$ stored on disk 1 (e.g., "4A"), data block $D_2$ stored on disk 2 (e.g., "4B"), data block $D_3$ stored on disk 3 (e.g., "4C") and parity block $P_A$ stored on disk 4 (e.g., "4D"), for example. The parity block $P_A$ can be computed using XOR logic of data block $D_1$, data block $D_2$ and data block $D_3$ (e.g., $P_A = D_1 \oplus D_2 \oplus D_3$). Additionally, the parity blocks in a RAID 5 array are distributed or staggered across the plurality of disks. Although RAID level 5 is discussed above, it should be understood that the RAID layer 302 can implement other RAID levels, such as RAID level 0, 1, 2, 3, 4 or 6.

The DVM layer 306 uses the block-level interface provided by the RAID layer 302 to manage the available storage capacity of the RAID array 320A and service I/O operations initiated by the initiators 8A-8N. The DVM layer 306 can implement a variety of storage management functions, such as volume virtualization, thin provisioning, snapshots, locking, data replication, etc. The DVM layer 306 can be implemented on the storage node 2 in software, hardware or a combination thereof. Volume virtualization provides the facility to create and manage multiple, logical volumes on the RAID array 320A, as well as expand a logical volume across multiple storage nodes within a storage cluster. Thin provisioning provides for the allocation of physical capacity of the RAID array 320A to logical volumes on an as-needed basis. For example, the available physical storage capacity of the RAID array 320A can be divided into a number of unique, equally-sized areas referred to as territories. Optionally, the size of a territory can be one terabyte (TB), a reduced size of 8 megabytes (MB) or any other territory size. Alternatively or additionally, the available physical storage capacity of the RAID array 320A can optionally be further subdivided into units referred to herein as provisions. The provisions can be unique, equally sized areas of the available physical capacity. For example, provisions may be 1 MB in size, a reduced size of 512 kilobytes (KB) or any other provision size. Optionally, a provision can be further subdivided into chunks. For example, the chunk size can be selected as 64 KB, a reduced size of 8 KB or any other chunk size. Snapshots provide functionality for creating and utilizing point-in-time snapshots of the contents of logical storage volumes. The locking functionality allows for synchronizing I/O operations within the storage node 2 or across nodes within the storage cluster. Data replication provides functionality for replication of data within the storage node 2 or across nodes within the storage cluster 2.

The cache layer 304 intercepts read and/or write I/O operations flowing between the RAID layer 302 and the DVM layer 306. The cache layer 304 is configured to read data from and/or write data to an SSD cache medium 330. The cache layer 304 can be implemented on the storage node 2 in software, hardware or a combination thereof. The SSD cache medium 330 can be used in either a write-through cache mode or a write-back cache mode. When the SSD cache medium 330 is controlled according to the write-through cache mode, a new read I/O operation (e.g., directed to a data block) is stored in the SSD cache medium 330 before returning the requested data block to the host (e.g., initiators 8A-8N shown in FIG. 1). Alternatively, the new read I/O operation can be performed in parallel, which decreases the response time to host. For example, once the requested data is retrieved from the mass storage devices 320, the retrieved data is stored in SSD cache medium 330 in parallel to returning the requested data block to the host. A subsequent read I/O operation requesting the read data block is retrieved from the SSD cache medium 330 instead of the mass storage devices 320. When the SSD cache medium 330 is controlled according to a write-back cache mode, a new write I/O operation (e.g., directed to a data block) is performed in the SSD cache medium 330. Then, the host (e.g., initiators 8A-8N shown in FIG. 1) is informed that the new write I/O operation is complete. At a later time, the data block (e.g., a dirty data block) is flushed or persisted to the mass storage devices 320 (e.g., the underlying stable medium). It should be understood that in either mode caching pairs the lower-latency SSD cache medium 330 with the mass storage devices 320. Additionally, the cache layer 304 can be configured to perform the operations for using the SSD cache medium 330 with the SSD filter and/or SSD pre-fetch algorithms as described in further detail below.

Figure 4:
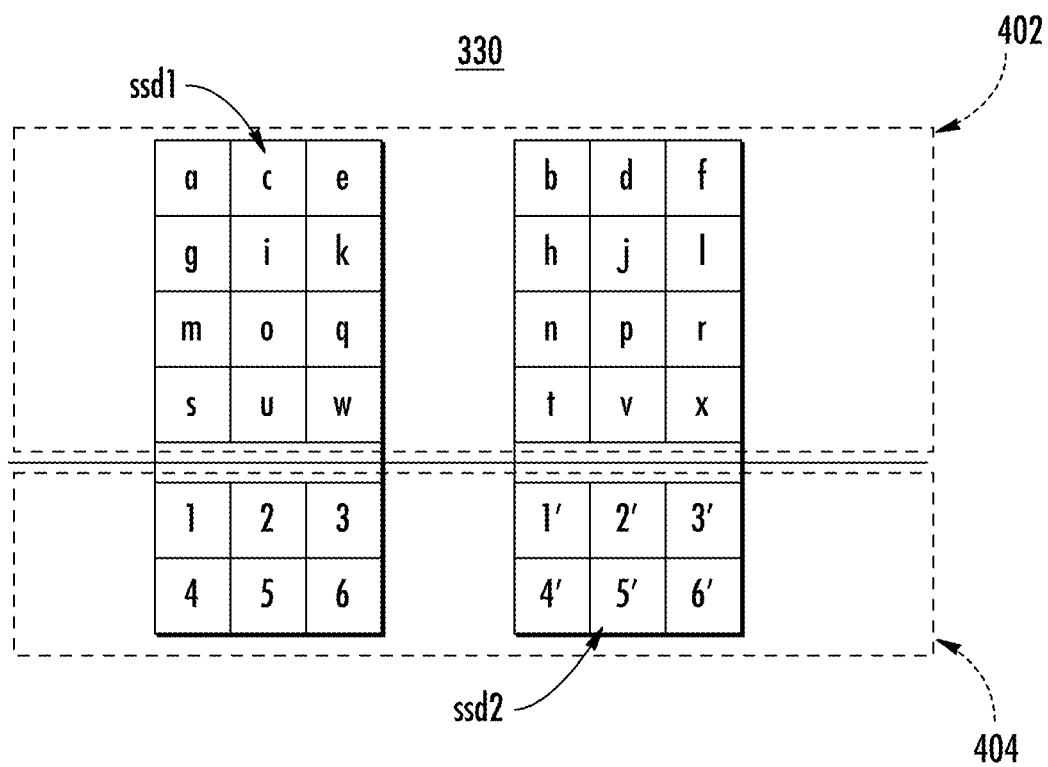
FIG. 4 is a block diagram illustrating an example SSD cache medium.

Referring now to FIG. 4, a block diagram illustrating an example SSD cache medium 330 according to aspects described herein is shown. The SSD cache medium 330 can include a plurality of SSDs, i.e., SSDs ssd1 and ssd2 as shown in FIG. 4. For example, each of SSDs ssd1 and ssd2 can have a capacity of 256 GB (i.e., 512 GB total capacity). It should be understood that the SSD cache medium 330 of FIG. 4 is provided only as an example and that the SSD cache medium 330 can include more or less than two SSDs. Additionally, it should be understood that SSDs ssd1 and ssd2 can have a capacity more or less than 256 GB, which is provided only as an example. The SSD cache medium 330 can be split into a plurality of cache regions. For example, the SSD cache medium 330 is split into a first cache region 402 and a second cache region 404. Each of the first and second cache regions 402 and 404 can include at least a portion of each of the SSDs. For example, the first cache region 402 occupies a portion of SSD ssd1 and a portion of SSD ssd2. Similarly, the second cache region 404 occupies a portion of SSD ssd1 and a portion of SSD ssd2. It should be understood that the SSD cache medium 330 can be split into more than two cache regions. In addition, the first cache region 402 and the second cache region 404 can be controlled according to different cache modes as described below.

The first cache region 402 can be maintained in the write-through cache mode (i.e., as a read cache), such that the first cache region 402 maintains read data blocks, for example. It should be understood that a cache layer (e.g., cache layer 304 shown in FIG. 3) can be configured to manage the first cache region 402. In the write-through cache mode, a new read I/O operation (e.g., directed to a data block) is stored in the first cache region 402. Additionally, a new write I/O operation (e.g., directed to a data block) is performed synchronously in the first cache region 402 and the mass storage devices (e.g., the underlying stable medium). In the first cache region 402, the data can be striped across the SSDs, for example, data blocks a, c, e, . . . and w are stored on SSD ssd1 and data blocks b, d, f, . . . and x are stored on SSD ssd2. Optionally, the first cache region 402 is maintained according to RAID level 0. It should be understood that striping the data across the SSDs in the first cache region 402 increases performance. In addition, subsequent read I/O operations directed to one of the data blocks stored in the first cache region 402 can be retrieved from the SSD cache medium 330 instead of the mass storage devices, which increases performance of the data storage system due to the lower latency of the SSD cache medium 330 as compared to the mass storage devices.

The second cache region 404 can be maintained in the write-back cache mode (i.e., as a write cache), such that the second cache region 404 maintains dirty data blocks (e.g., data blocks not yet flushed to the mass storage devices), for example. It should be understood that a cache layer (e.g., cache layer 304 shown in FIG. 3) can be configured to manage the second cache region 404. In the write-back cache mode, a new write I/O operation is performed in the second cache region 404. At a later time, for example according to a flushing policy, one or more data blocks stored in the second cache region 404 can be flushed or persisted to the mass storage devices (e.g., the underlying stable medium). It should be understood that using a write-back cache increases performance of the data storage system due to the lower latency of the SSD cache medium 330 as compared to the mass storage devices. In the second cache region 404, the data can be mirrored across the SSDs, for example, data blocks 1, 2, 3, . . . and 6 are stored on SSD ssd1 and data blocks 1', 2', 3', . . . and 6' (e.g., mirror copies of data blocks 1, 2, 3, . . . and 6) are stored on SSD ssd2. Optionally, the second cache region 404 is maintained according to RAID level 1. By mirroring data blocks across the SSDs, it is possible to protect this data in the event of failure of either one of SSD ssd1 or SSD ssd2. It should be understood that protection against data loss in the event of device failure is provided in addition to protection against data loss in the event of power failure, which is provided by the non-volatile SSDs. Unlike a write-through cache where the data blocks are always available in the underlying stable medium, the data blocks stored in a write-back cache are not protected against SSD failure until the data blocks are actually flushed to the underlying stable medium. Accordingly, the data stored in the second cache region 404 is mirrored to provide redundancy in the event of SSD failure.

As described above, it is desirable to maximize the use of the available storage capacity of the SSD cache medium 330 due to its superior I/O performance capability as compared to that of the physical storage medium (e.g., the mass storage devices 320 shown in FIG. 3). An example technique to maximize use of the SSD cache medium 330 is to accommodate both smaller, random I/O operations as well as larger, sequential I/O operations. For example, instead of using 64 KB cache line granularity similar to conventional SSD cache applications, a smaller SSD cache line granularity such as 8 KB, for example, can optionally be used with the techniques described herein to maximize use of the SSD cache medium 330. When using 64 KB cache line granularity, a 64 KB cache line is underutilized when less than 64 KB of data (e.g., only 8 KB of data from a random I/O) is stored in the cache line. In other words, a portion of the storage capacity of the 64 KB cache line remains unused when only 8 KB of data is stored therein. On the other hand, when using 8 KB cache line granularity, use of the available storage capacity of the SSD cache medium 330 is maximized because less storage space is underutilized. For example, the SSD cache medium with 8 KB cache line granularity can accommodate smaller, random I/O operations (e.g., 8 KB of data) in a single cache line, as well as larger, sequential I/O operations (e.g., 32 KB of data) in multiple cache lines. It should be understood that 8 KB cache line granularity is provided herein only as an example of smaller SSD cache line granularity and that SSD cache line granularity more or less than 8 KB (e.g., 4 KB, 16 KB, 32 KB, etc.) can be used with to the techniques described herein.

Each of SSDs ssd1 and ssd2 can have a capacity of 256 GB (i.e., 512 GB total capacity), for example. Optionally, 192 GB of each of SSDs ssd1 and ssd2 (e.g., 392 GB total capacity for the first cache region 402) can be controlled as the read cache, and 64 GB of each of the SSDs ssd1 and ssd2 (e.g., 64 GB total capacity for the second cache region 404) can be controlled as the write cache. Thus, the total capacity of the SSD cache medium 330 is 448 GB (i.e., 192 GB+192 GB+64 GB), and with 8 KB cache granularity, the SSD cache medium 330 can accommodate 56 million cache lines (e.g., 448 GB/8 KB). Additionally, the physical storage medium (e.g., the mass storage devices 320 shown in FIG. 3) can optionally have a capacity of 64 TB, for example. With 8 KB cache line granularity, there are 8 billion (e.g., 64 TB/8 KB) possible data blocks to store in the SSD cache medium 330 (which only has a capacity for 56 million cache lines). Accordingly, it may be desirable to filter read I/O operations to determine which read I/O operations to load into the SSD cache medium in order to maximize use of the SSD cache medium. It should be understood that the SSDs, as well as the first and second cache regions, and the physical storage medium can have capacities greater or less than described above, which are provided only as examples.

Figure 5:
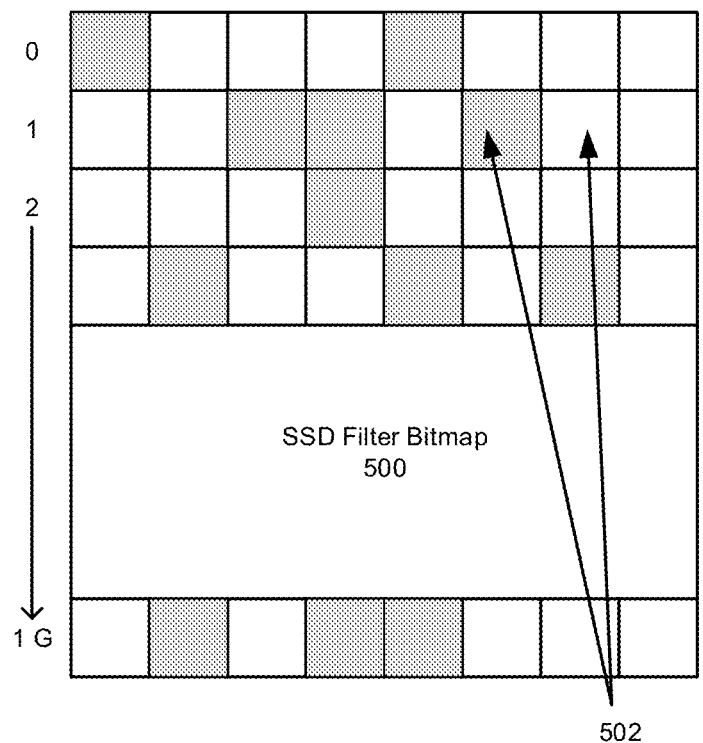
FIG. 5 is a block diagram illustrating an example SSD filter bitmap.

Referring now to FIG. 5, a block diagram illustrating an example SSD filter bitmap 500 is shown. The SSD filter bitmap 500 can be used to determine when to load read I/O operations into an SSD cache medium (e.g., the SSD cache medium 330 shown in FIGS. 3 and 4) for a physical storage medium (e.g., the mass storage devices 320 shown in FIG. 3). The SSD filter bitmap 500 can include a plurality of bits 502, where each of the bits 502 corresponds to a respective data block of the physical storage medium. For example, if the physical storage medium has a capacity of 64 TB as described in the example above, each of the bits 502 can represent an 8 KB data block. In other words, each of the bits 502 can correspond to one of the 8 billion possible data blocks of the physical storage medium that may be cached in the SSD cache medium 330. This results in 1 GB of storage space required to maintain the SSD filter bitmap 500 (i.e., $$\left(\text{i.e., } \frac{64 \text{ TB}}{8 \text{ KB}} \times 1 \text{ bit} = 8 \text{ Gigabits} = \frac{8 \text{ GigaBits}}{8 \text{ Bits}} = 1 \text{ GB}\right).$$

With 8 billion possible data blocks to cache in only 56 million possible cache lines (e.g., in the example SSD cache medium described above), loading data blocks into the SSD cache medium 330 in response to every I/O operation results in inefficient use of the SSD cache medium 330, particularly when the I/O operations are random read I/O operations (e.g., random, 8 KB read I/O operations). Therefore, by not loading (or filtering) certain I/O operations, it is possible to avoid congesting the SSD cache medium 330. Further, it is also possible to avoid or minimize the number of operations needed to free up space in the SSD cache medium 330, which place additional load on the data storage system.

The bits 502 can initially be set to a first predetermined value, for example, 0. Bits 502 set to the first predetermined value are white or un-shaded in FIG. 5. When a first read I/O operation directed to a particular data block of the physical storage medium is received, the corresponding bit in the SSD filter bitmap 500 can be referenced. If the corresponding bit in the SSD filter bitmap 500 is set to the first predetermined value (e.g., 0), the particular data block is not stored in the SSD cache medium 330, so the first read I/O operation is serviced (or retrieved, performed, etc.) from the physical storage medium. In other words, when the corresponding bit in the SSD filter bitmap 500 is set to the first predetermined value, the first read I/O operation is an initial read I/O operation, an optionally, an initial read I/O operation during a predetermined time period. In response to the first read I/O operation, data for the particular data block is not loaded into the SSD cache medium 330. Additionally, the corresponding bit in the SSD filter bitmap 500 is set to a second predetermined value (e.g., 1) in response to the first read I/O operation. As described below, when a bit in the SSD filter bitmap 500 is set to the second predetermined value, the data block of the physical storage medium may be stored in the SSD cache medium 330. It should be understood that the first and second predetermined values can optionally be 1 and 0, respectively (instead of 0 and 1, respectively).

When a second read I/O operation directed to the same particular data block of the physical storage medium is received, the corresponding bit in the SSD filter bitmap 500 can be referenced. If the corresponding bit in the SSD filter bitmap 500 is set to the second predetermined value (e.g., 1), the particular data block may be stored in the SSD cache medium 330. In other words, when the corresponding bit in the SSD filter bitmap 500 is set to the second predetermined value, the second read I/O operation is a subsequent read I/O operation, and optionally, a subsequent read I/O operation during a predetermined time period, and may be stored in the SSD cache medium 330. To determine if the particular data block is stored in the SSD cache medium 330, a search of the SSD cache medium 330 can be conducted. For example, cache headers can be provided for each cache line of the SSD cache medium 330 in order to manage the cache lines. A cache header can be used to associate a cache line (e.g., the data stored in the cache line) with a corresponding data block stored in the physical storage medium (e.g., the mass storage devices 320 shown in FIG. 3). For example, a cache header can include an index to (or storage address of) a cache line in the SSD cache medium 330 and a tag to (or storage address of) the corresponding data block stored in the physical storage medium. Additionally, the cache headers can be stored in a data structure such as a hash list, for example. Then, the cache headers can be searched to determine whether the I/O operation is a cache hit or a cache miss. If the search reveals a cache hit (i.e., the data for the particular data block is stored in the SSD cache medium 330), the second read I/O operation is serviced (or performed, retrieved, etc.) from the SSD cache medium 330. On the other hand, if the search reveals a cache miss (i.e., the data for the particular data block is not stored in the SSD cache medium 330), the second read I/O operation is serviced (or performed, retrieved, etc.) from the physical storage medium and then loaded into the SSD cache medium in response to the second read I/O operation. In addition, a cache header is allocated and the hash list is updated accordingly for the newly cached data block.

Therefore, by using the SSD filter bitmap 500, a decision can be made as to when to load read I/O operations into the SSD cache medium 330 based on access frequency of the data blocks of the physical storage medium. For example, data for the particular data block to which the read I/O operation is directed is not loaded into the SSD cache medium 330 until a subsequent read I/O directed to the same particular data block is received. Accordingly, data is not loaded into the SSD cache medium 330 in response to single, random read I/O operations. This increases the write endurance of the SSD cache medium 330 because a read I/O operation directed to a particular data block of the physical storage medium is not cached until a subsequent read I/O operation directed to the same particular data block is received.

Optionally, one or more of the bits 502 of the SSD filter bitmap 500 can be periodically re-set to the first predetermined value (e.g., 0). It should be understood that eventually all of the bits 502 of the SSD filter bitmap 500 may be set to the second predetermined value (e.g., 1) over a period of time, for example, after read I/O operations directed to all of the data blocks of the physical storage medium are received. With all of the bits 502 (or even substantially all of the bits 502) of the SSD filter bitmap 500 set to the second predetermined value, the advantage of using the SSD filter bitmap 500 may be lost. Therefore, one or more of the bits 502 of the SSD filter bitmap 500 can be re-set to the first predetermined value (e.g., 0), for example, at predetermined time intervals. Optionally, the bits 502 of the SSD filter bitmap 500 that correspond to respective data blocks of the physical storage medium having a frequency of access less than a threshold value can be re-set to the first predetermined value. For example, each SSD cache header in the hash list can have a field with a counter that is incremented for every cache it (i.e., a frequency count field). It should be understood that the value in the frequency count field can be used to set/reset the SSD filter bitmap. This disclosure contemplates that the time intervals for re-setting the bits 502 can be selected by the user and can have any value.

Alternatively or additionally, the SSD filter bitmap 500 and the physical storage medium can be divided into a plurality of zones, where each of the zones of the SSD filter bitmap 500 corresponds to a respective zone of the physical storage medium. For example, the 8 billion possible data blocks of the physical storage medium (described in the example above) can be divided into equally-sized zones with 8 million data blocks each (i.e., approximately 1,000 zones).

Thus, each zone of the SSD filter bitmap 500 (which requires 1 GB of memory as described in the example above) would require 1 MB of memory (i.e., $$\left(i.e., \frac{1\ GB}{1,000\ zones} = 1\ MB\ per\ zone\right).$$

Figure 6:
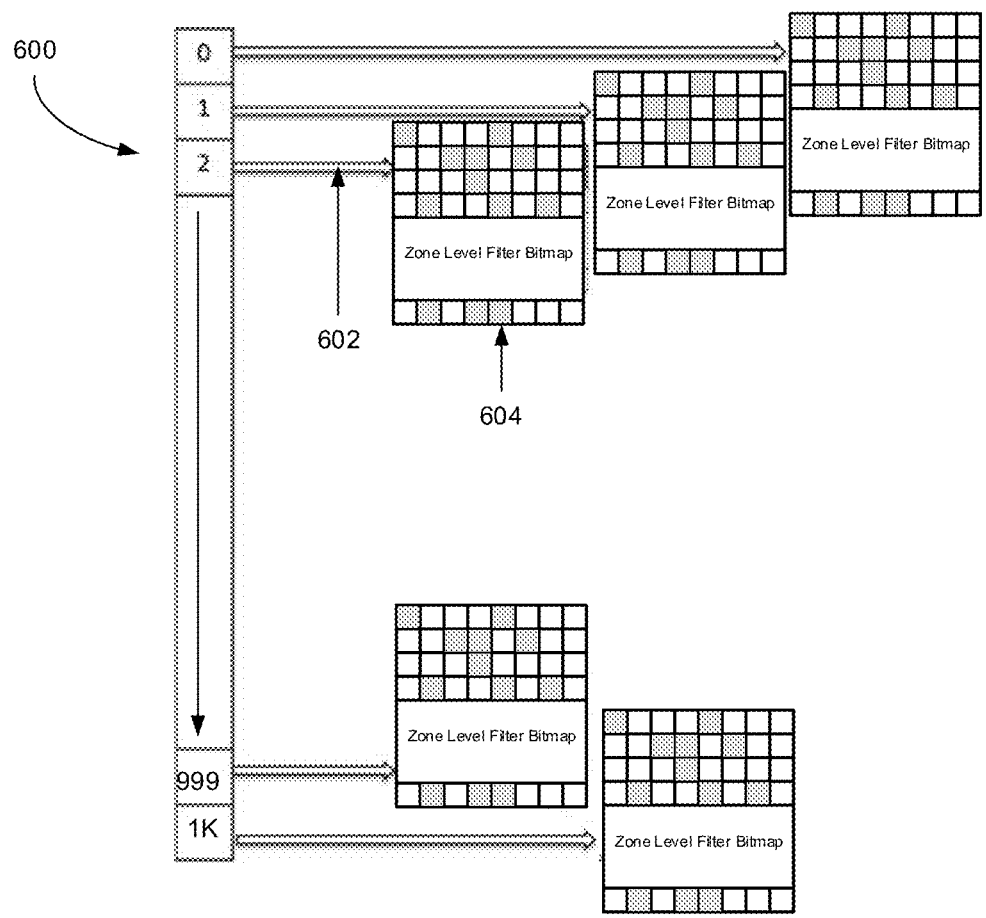
FIG. 6 is a block diagram illustrating a table with a plurality of zone level filter bitmaps.

It should be understood that the size and number of zones described above is provided only as an example and that other sizes and numbers for the zones can be used. Memory for the SSD filter bitmap 500 can therefore be allocated on demand as read I/O operations directed to the corresponding zones of the physical storage medium are received, which uses the memory more efficiently. For example, a 1 MB zone of the SSD filter bitmap 500 can be allocated each time an initial read I/O operation directed to a corresponding zone of the physical storage medium is received. Additionally, a table can be maintained for storing pointers to each zone of the SSD filter bitmap 500. An example table 600 for storing a plurality of pointers 602 to each zone of the SSD filter bitmap is shown in FIG. 6. For example, the table 600 can have 1000 pointers 602, each pointer corresponding to one of the 1000 zones described above. Although the table 600 contains 1000 pointers 602, it should be understood that the table 600 can contain more or less than 1000 pointers, for example, optionally depending on the number of zones. Each pointer can point to a zone level filter bitmap 604. Each zone level filter bitmap 604 can have features similar to the SSD filter bitmap 500 of FIG. 5. Additionally, each zone level filter bitmap 604 can be allocated as and when needed.

Thin client infrastructures, for example, where multiple thin client devices boot from the same physical storage medium (e.g., the mass storage devices 320 shown in FIG. 3) have been widely deployed. In these infrastructures, the same set of data blocks stored on the physical storage medium may be periodically accessed at specific times by the thin client devices. For example, at the beginning of a work day (e.g., approximately 8 AM daily), users may boot their respective thin client devices from the physical storage medium. In other words, 8 AM daily may be a "peak time slot" as used herein. It may therefore be desirable to identify the peak time slot (or peak time slots), as well as the specific data blocks that are accessed, and pre-fetch these data blocks from the physical storage medium and load these data blocks into the SSD cache medium 330 prior to the peak time slot. This can considerably speed up access times because the SSD cache medium 330 has superior I/O performance capability as compared to that of the physical storage medium.

Figure 7:
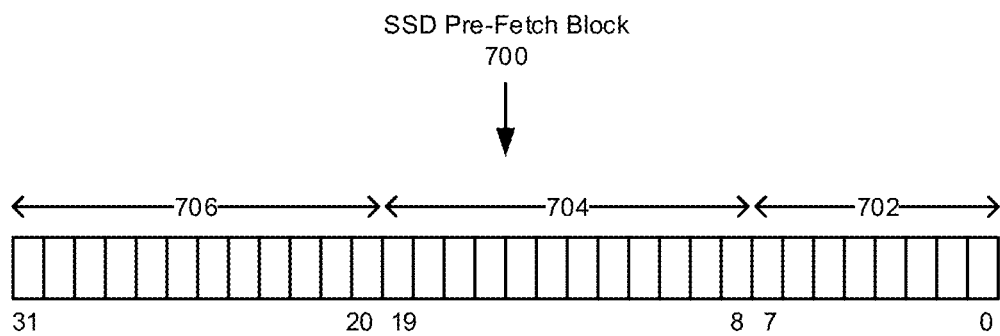
FIG. 7 is a block diagram illustrating an example SSD pre-fetch block.

Referring now to FIG. 7, a block diagram illustrating an example SSD pre-fetch block 700 is shown. The SSD pre-fetch block 700 can be used to record historic access data for a particular data block of the physical storage medium and use the historic access data to pre-fetch the particular data block for loading into the SSD cache medium. For example, an SSD pre-fetch block 700 can be maintained for each respective 1 MB data block of the physical storage medium. In the example described below, the respective SSD pre-fetch block for each data block of the physical storage medium is 4 bytes (or 32 bits). It should be understood that the sizes of the data blocks of the physical storage medium (e.g., 1 MB) and the SSD pre-fetch block (e.g., 4 bytes) are provided only as examples and that other sizes can be used.

The SSD pre-fetch block 700 can include a time access counter 702 (8 bits), a day access bitmap 704 (12 bits) and a pre-fetch bitmap 706 (12 bits). The time access counter 702 can include a plurality of bits (e.g., bits 0-7) and can be used to track the number of times a particular data block (e.g., a corresponding 1 MB data block) of the physical storage medium is accessed during a respective time slot. As described below, the time slot can be any user-defined length of time (e.g., 1 hour, 2 hour, etc.). When the time access counter 702 reaches the maximum value (i.e., $2^8=256$ accesses for an 8-bit counter), the time access counter 702 can maintain the maximum value for the remainder of the time slot before being reset to zero at the beginning of the next time slot. The time access counter 702 is reset at the beginning of the next time slot to record access data for the next time slot.

The day access bitmap 704 can include a plurality of bits (e.g., bits 8-19), where each bit corresponds to a respective time slot. Thus, the day access bitmap 704 can be used to store information about whether a particular data block of the physical storage medium was accessed at least a threshold number of times during each respective time slot. As described above, the time access counter 702 can be used to track the number of times the particular data block of the physical storage medium is accessed during each respective time slot. At the end of each respective time slot, a bit corresponding to each respective time slot can be set to a predetermined value (e.g., 1) if the particular data block was accessed at least the threshold number of times as tracked by the time access counter 702. It should be understood that the threshold number of times can be any user-defined value and/or be adaptively modified. Optionally, each of the bits of the day access bitmap 704 can correspond to an equal-length time slot, e.g., each 1 bit can correspond to a 2-hour time slot during the 24-hour period in a day. For example, bit 8 corresponds to 12 AM-2 AM, bit 9 corresponds to 2 AM-4 AM, bit 10 corresponds to 4 AM-6 AM . . . and bit 19 corresponds to 10 PM-12 PM in a given day. Alternatively, the bits of the day access bitmap 704 can optionally correspond to a plurality of unequal-length time slots, e.g., each 1 bit can correspond to different length time slots during the 24-hour period in a day. For example, each of bits 8-15 can correspond to a 1-hour time slot between 9 AM and 5 PM, bit 16 can correspond to 5 PM-9 PM, bit 17 can correspond to 9 PM-1 AM, bit 18 can correspond to 1 AM-5 AM and bit 19 can correspond to 5 AM-9 AM. It should be understood that the length, as well as the start/stop times, of each respective time slot can be user-defined and should not be limited to the examples provided above.

After the 24-hour period, the day access bitmap 704 can be stored and then the bits of the day access bitmap 704 can be re-set (e.g., to 0) so that access information can be collected for the next 24-hour period. The day access bitmap 704 can be retained for any user-defined period of time, e.g., 1 week, 2 weeks, 3 weeks, etc. The day access bitmaps provide historical access data for a particular data block of the physical storage medium and can be used as described below to create the pre-fetch bitmap 706.

The pre-fetch bitmap 706 can include a plurality of bits (e.g., bits 20-31), where each bit corresponds to a respective time slot. Similar as described above with regard to the day access bitmap 704, each of the bits of the pre-fetch bitmap 706 can correspond to an equal-length time slot, e.g., each 1 bit can correspond to a 2-hour time slot during the 24-hour period in a day. For example, bit 20 corresponds to 12 AM-2 AM, bit 21 corresponds to 2 AM-4 AM, bit 22 corresponds to 4 AM-6 AM . . . and bit 31 corresponds to 10 PM-12 PM in a given day. Alternatively, the bits of the pre-fetch bitmap 706 can optionally correspond to a plurality of unequal-length time slots, e.g., each 1 bit can correspond to different length time slots during the 24-hour period in a day. For example, each of bits 20-27 can correspond to a 1-hour time slot between 9 AM and 5 PM, bit 28 can correspond to 5 PM-9 PM, bit 29 can correspond to 9 PM-1 AM, bit 30 can correspond to 1 AM-5 AM and bit 31 can correspond to 5 AM-9 AM. It should be understood that the length, as well as the start/stop times, of each respective time slot can be user-defined and should not be limited to the examples provided above.

In addition, the respective bits of the pre-fetch bitmap 706 can be set to the predetermined value (e.g., 1) based on historic access data for the particular data block of the physical storage medium. For example, the respective bits of the pre-fetch bitmap 706 that represent peak time slots can be set to the predetermined value. The peak time slots can be determined from the historic access data, for example, from the day access bitmaps retained in memory. For example, one or more respective bits of the pre-fetch bitmap 706 can be set to the predetermined value by performing an OR function on respective bits of a plurality of day access bitmaps for the particular data block of the physical storage medium. In other words, the peak time slots are time slots when any one of the day access bitmaps contains a bit set to the predetermined value for a respective time slot (i.e., the particular data block was accessed at least the threshold number of times during the respective time slot). Alternatively, one or more respective bits of the pre-fetch bitmap 706 can be set to the predetermined value by performing an AND function on respective bits of a plurality of day access bitmaps for the particular data block of the physical storage medium. In other words, the peak time slots are time slots when all of the day access bitmaps contain a bit set to the predetermined value for a respective time slot (i.e., the particular data block was accessed at least the threshold number of times during the respective time slot).

After setting the respective bits of the pre-fetch bitmap 706 to the predetermined value as described above, the pre-fetch bitmap 706 can be loaded into the pre-fetch block 700, for example, at or before a beginning of a time period such as a day, for example. Then, at or before a beginning of each respective time slot during the time period, the pre-fetch bitmap 706 can be referenced to determine if the respective time slot is a peak time slot (e.g., the respective bit of the pre-fetch bitmap 706 is set to the predetermined value). If the respective time slot is a peak time slot, then the particular data block of the physical storage medium is loaded into the SSD cache medium 330. Accordingly, the particular data block will be available to the thin client devices in the SSD cache medium 330 at or before the peak time slot, which can considerably speed up access times because the SSD cache medium 330 has superior I/O performance capability as compared to that of the physical storage medium.

Figure 8A:
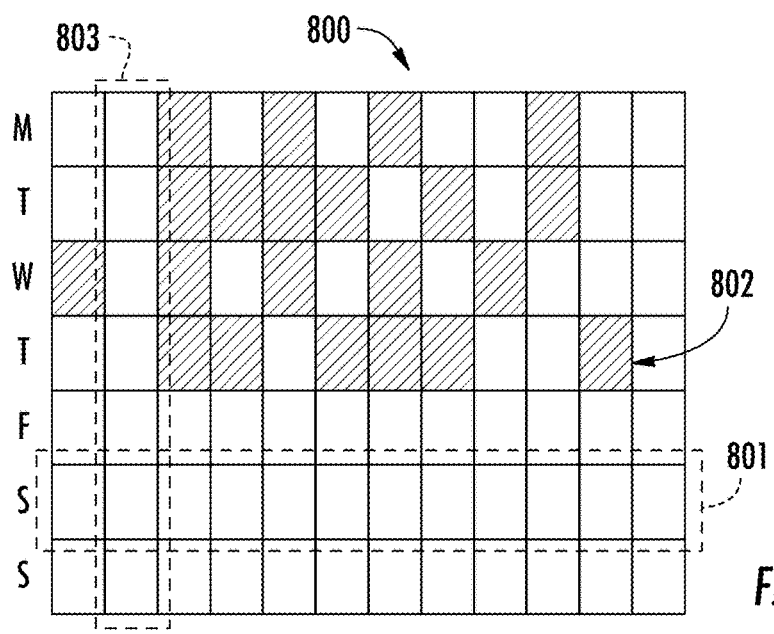
FIG. 8A is a block diagram illustrating example day access bitmaps for a data block for a 1-week period.

Referring now to FIG. 8A, a block diagram illustrating example day access bitmaps 800 for a data block for a 1-week period is shown. Each day access bitmap can be a day access bitmap as discussed above (e.g., the day access bitmap 704). The day access bitmaps are for each day of the week, e.g., Monday ("M"), Tuesday ("T"), Wednesday ("W"), Thursday ("T"), Friday ("F"), Saturday ("S") and Sunday ("S"). The day access bitmap for each day of the week is arranged in a row, for example, the day access bitmap for Saturday is arranged in row 801. In addition, the respective time slots are arranged in columns, for example, column 803. In addition, respective bits of each day access bitmap set to the predetermined value (e.g., 1) are shaded in FIG. 8A such as bit 802.

Figure 8B:
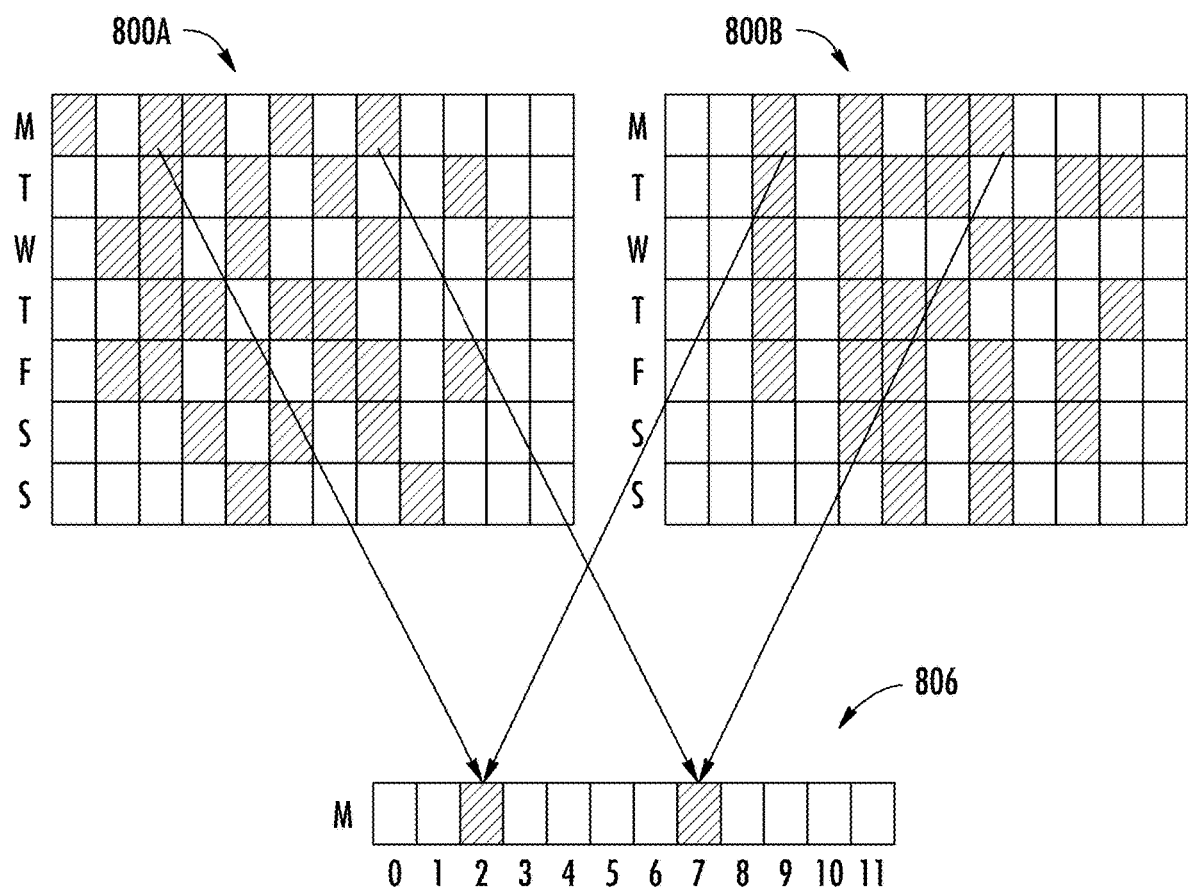
FIG. 8B is a block diagram illustrating example day access bitmaps and a pre-fetch bitmap for a data block.

Referring now to FIG. 8B, a block diagram illustrating example day access bitmaps 800A and 800B and pre-fetch bitmap 806 for a data block is shown. The pre-fetch bitmap 806 can be a pre-fetch bitmap as described above (e.g., the pre-fetch bitmap 706). The day access bitmaps 800A and 800B can optionally be day access bitmaps for two different weeks such as two consecutive weeks, for example. The day access bitmaps 800A and 800B for the two different weeks are the similar to the day access bitmaps 800 for a 1-week period described above with regard to FIG. 8A and are therefore not described in further detail below. As described above, the respective bits of the pre-fetch bitmap 806 can be set to a predetermined value (e.g., 1) based on historic access data for the particular data block of the physical storage medium. For example, in FIG. 8B, the respective bits of the pre-fetch bitmap 806 are set to the predetermined value by performing an AND function on respective bits of the day access bitmap for Monday of the day access bitmaps 800A for a first week and respective bits of the day access bitmap for Monday of the day access bitmaps 800B for a second week. As a result, bits 2 and 7 of the pre-fetch bitmap 806 are set to the predetermined value. Alternatively, as described above, the respective bits of the pre-fetch bitmap 806 can be set to the predetermined value by performing an OR function on respective bits of the day access bitmap for Monday of the day access bitmaps 800A for a first week and respective bits of the day access bitmap for Monday of the day access bitmaps 800B for a second week, which would result in bits 0 and 2-7 of the pre-fetch bitmap 806 being set to the predetermined value (not shown in FIG. 8B). Setting bits of the pre-fetch bitmap using the AND function (as opposed to the OR function) ensures that the data for the particular data block is accessed more frequently. Although two, and optionally consecutive, weeks of day access bitmaps are used as an example in FIG. 8B, it should be understood that a different number and/or lengths of time periods (e.g., multiple weeks, months, years, etc.) can be used with the techniques described herein.

Figure 9:
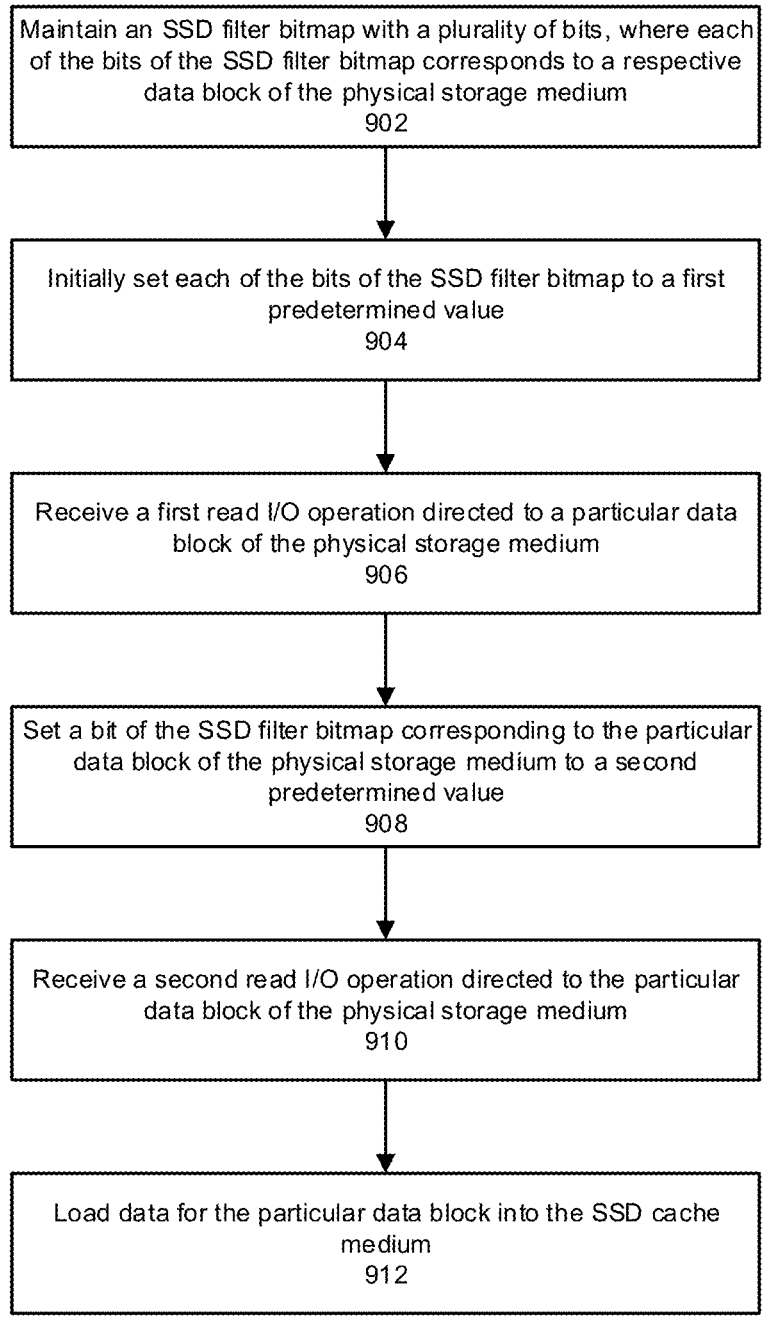
FIG. 9 is a flow diagram illustrating example operations for determining when to load read I/O operations into an SSD cache medium for a physical storage medium of a data storage system.
Figure 10:
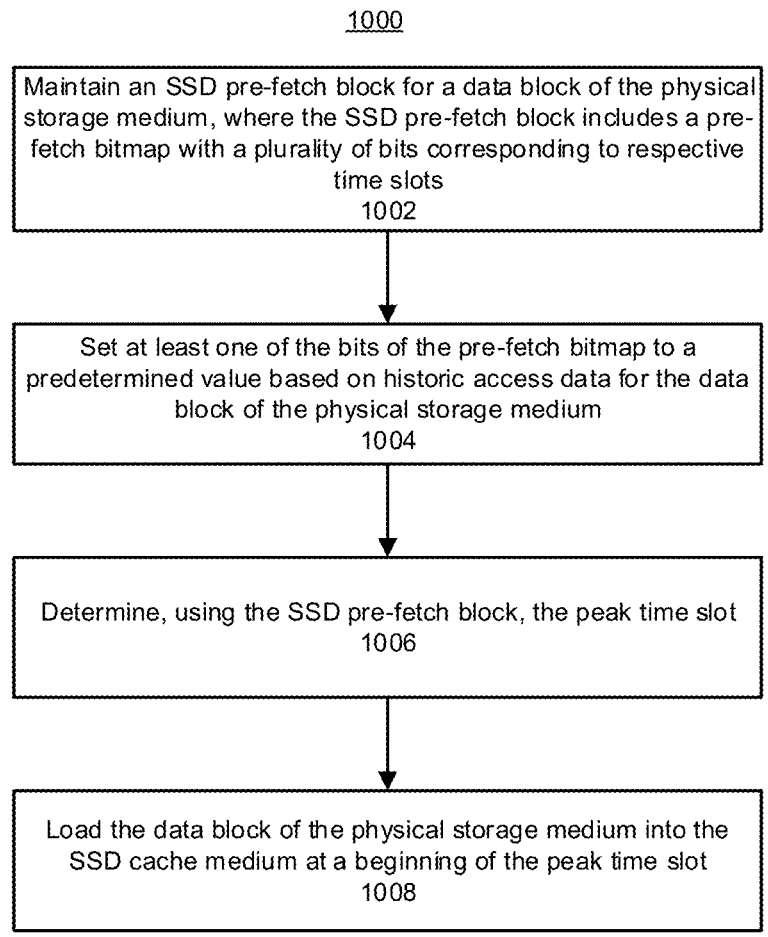
FIG. 10 is a flow diagram illustrating example operations for pre-fetching data blocks stored in a physical storage medium of a data storage system and loading the data blocks into an SSD cache medium for the physical storage medium.

Referring now to FIGS. 9-10, flow diagrams illustrating example operations described herein are shown. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 9 is a flow diagram illustrating example operations 900 for determining when to load read I/O operations into an SSD cache medium for a physical storage medium of a data storage system. At 902, an SSD filter bitmap with a plurality of bits is maintained, where each of the bits of the SSD filter bitmap corresponds to a respective data block of the physical storage medium. The SSD filter bitmap can be the SSD filter bitmap 500 described above with regard to FIG. 5. At 904, each of the bits of the SSD filter bitmap is initially set to a first predetermined value (e.g., 0), for example. At 906, a first read I/O operation directed to a particular data block of the physical storage medium is received. The first read I/O operation can be an initial read I/O operation directed to the particular data block. At 908, in response to receiving the first read I/O operation, a bit of the SSD filter bitmap corresponding to the particular data block of the physical storage medium is set to a second predetermined value (e.g., 1). In addition, as described above, the data for the particular data block of the physical storage medium is not loaded into a SSD cache medium (e.g., the SSD cache medium 330 shown in FIGS. 3 and 4) in response to the first read I/O operation. At 910, a second read I/O operation directed to the particular data block of the physical storage medium is received. The second read I/O operation can be a subsequent read I/O operation directed to the particular data block. As described above, when the SSD filter bitmap is referenced, and the corresponding bit is set to the second predetermined value, it indicates that the particular data block may already be stored in the SSD cache medium. To determine if the particular data block is stored in the SSD cache medium, a cache search can be conducted. For a cache miss, at 912, in response to receiving the second I/O operation, the data for the particular data block is loaded into the SSD cache medium, for example, after being serviced from the physical storage medium. For a cache hit, in response to receiving the second I/O operation, the data for the particular data block is serviced from the SSD cache medium.

FIG. 10 is a flow diagram illustrating example operations 1000 for pre-fetching data blocks stored in a physical storage medium of a data storage system and loading the data blocks into an SSD cache medium for the physical storage medium. At 1002, an SSD pre-fetch block for a data block of the physical storage medium is maintained, where the SSD pre-fetch block includes a pre-fetch bitmap with a plurality of bits corresponding to respective time slots. The SSD pre-fetch block can be an SSD pre-fetch block as described above (e.g., the SSD pre-fetch block 700 shown in FIG. 7). At 1004, at least one of the bits of the pre-fetch bitmap is set to a predetermined value based on historic access data for the data block of the physical storage medium, where the bits of the pre-fetch bitmap set to the predetermined value mark a peak time slot. For example, as described above with regard to FIGS. 7-8B, the respective bits of the pre-fetch bitmap can be set by performing an OR function or an AND function on respective bits of day access bitmaps for the particular data block for previous time periods. Setting bits of the pre-fetch bitmap using the AND function (as opposed to the OR function) ensures that the data for the particular data block is accessed more frequently. At 1006, using the SSD pre-fetch block, the peak time slot(s) is(are) determined. Then, at 1008, the data block of the physical storage medium is loaded into the SSD cache medium at a beginning of the peak time slot(s).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A computer-implemented method for determining when to load read I/O operations into an SSD cache medium for a physical storage medium of a data storage system, comprising:

dividing the physical storage medium comprising a plurality of equally-sized data blocks into a plurality of zones, wherein each of the zones comprises a different set of the plurality of equally-sized data blocks;

maintaining an SSD filter bitmap including a plurality of bits, each of the bits of the SSD filter bitmap corresponding to a respective equally-sized data block of the physical storage medium, wherein the SSD filter bitmap comprises a plurality of zone level SSD filter bitmaps, each respective zone level SSD filter bitmap corresponding to a different zone of the physical storage medium;

initially setting each of the bits of the SSD filter bitmap to a first binary value;

receiving a first read I/O operation directed to a particular data block of the physical storage medium;

in response to receiving the first read I/O operation, setting a bit of the SSD filter bitmap corresponding to the particular data block of the physical storage medium to a second binary value;

receiving a second read I/O operation directed to the particular data block of the physical storage medium;

in response to receiving the second I/O operation, loading data for the particular data block into the SSD cache medium;

referencing the SSD filter bitmap to determine whether to search the SSD cache medium; and allocating memory for the respective zone level SSD filter bitmaps on demand in response to receiving an initial read I/O operation directed to the respective zones of the physical storage medium.

2. The computer-implemented method of claim 1, further comprising:

determining, using the SSD filter bitmap, that the first read I/O operation is an initial read I/O operation directed to the particular data block of the physical storage medium; and servicing the first read I/O operation from the physical storage medium, wherein the data for the particular data block is not loaded into the SSD cache medium in response to the first read I/O operation.

3. The computer-implemented method of claim 1, further comprising:

determining, using the SSD filter bitmap, that the second read I/O operation is a subsequent read I/O operation directed to the particular data block of the physical storage medium;

determining whether the data for the particular data block is stored in the SSD cache medium;

if the data for the particular data block is stored in the SSD cache medium, servicing the second read I/O operation from the SSD cache medium; and if the data for the particular data block is not stored in the SSD cache medium, servicing the second read I/O operation from the physical storage medium and loading the data for the particular data block into the SSD cache medium in response to the second read I/O operation.

4. The computer-implemented method of claim 1, further comprising periodically re-setting at least one of the bits of the SSD filter bitmap to the first binary value, wherein the at least one of the bits corresponds to a respective equally-sized data block of the physical storage medium having a frequency of access less than a threshold value.

5. A data storage system, comprising:
a physical storage medium;
an SSD cache medium for the physical storage medium; and
a data storage system computer including a processor and a memory in communication with the processor, the memory having computer-executable instructions stored thereon for determining when to load read I/O operations into the SSD cache medium for the physical storage medium that, when executed by the processor, cause the data storage system computer to:

divide the physical storage medium comprising a plurality of equally-sized data blocks into a plurality of zones, wherein each of the zones comprises a different set of the plurality of equally-sized data blocks;

maintain an SSD filter bitmap including a plurality of bits, each of the bits of the SSD filter bitmap corresponding to a respective equally-sized data block of the physical storage medium, wherein the SSD filter bitmap comprises a plurality of zone level SSD filter bitmaps, each respective zone level SSD filter bitmap corresponding to a different zone of the physical storage medium;

initially set each of the bits of the SSD filter bitmap to a first binary value;

receive a first read I/O operation directed to a particular data block of the physical storage medium;

in response to receiving the first read I/O operation, set a bit of the SSD filter bitmap corresponding to the particular data block of the physical storage medium to a second binary value;

receive a second read I/O operation directed to the particular data block of the physical storage medium;

in response to receiving the second I/O operation, load data for the particular data block into the SSD cache medium;

reference the SSD filter bitmap to determine whether to search the SSD cache medium; and allocate memory for the respective zone level SSD filter bitmaps on demand in response to receiving an initial read I/O operation directed to the respective zones of the physical storage medium.

6. The data storage system of claim 5, wherein the memory has further computer-executable instructions stored thereon that, when executed by the processor, cause the data storage system computer to:

determine, using the SSD filter bitmap, that the first read I/O operation is an initial read I/O operation directed to the particular data block of the physical storage medium; and service the first read I/O operation from the physical storage medium, wherein the data for the particular data block is not loaded into the SSD cache medium in response to the first read I/O operation.

7. The data storage system of claim 5, wherein the memory has further computer-executable instructions stored thereon that, when executed by the processor, cause the data storage system computer to:

determine, using the SSD filter bitmap, that the second read I/O operation is a subsequent read I/O operation directed to the particular data block of the physical storage medium;

determine whether the data for the particular data block is stored in the SSD cache medium;

if the data for the particular data block is stored in the SSD cache medium, service the second read I/O operation from the SSD cache medium; and if the data for the particular data block is not stored in the SSD cache medium, service the second read I/O operation from the physical storage medium and load the data for the particular data block into the SSD cache medium in response to the second read I/O operation.

8. The data storage system of claim 5, wherein the memory has further computer-executable instructions stored thereon that, when executed by the processor, cause the data storage system computer to periodically re-set at least one of the bits of the SSD filter bitmap to the first binary value, wherein the at least one of the bits corresponds to a respective equally-sized data block of the physical storage medium having a frequency of access less than a threshold value.

9. The computer-implemented method of claim 1, further comprising maintaining a table comprising a plurality of pointers, each of the pointers corresponding to one of the respective zone level SSD filter bitmaps.

10. The data storage system of claim 5, wherein the memory has further computer-executable instructions stored thereon that, when executed by the processor, cause the data storage system computer to maintain a table comprising a plurality of pointers, each of the pointers corresponding to one of the respective zone level SSD filter bitmaps.

* * * * *